US011941298B2

(12) United States Patent
Chou et al.

(10) Patent No.: US 11,941,298 B2
(45) Date of Patent: Mar. 26, 2024

(54) ABORT HANDLING BY HOST CONTROLLER FOR STORAGE DEVICE

(71) Applicant: MediaTek Inc., Hsinchu (TW)

(72) Inventors: Chih-Chieh Chou, Hsinchu (TW); Chia-Chun Wang, Hsinchu (TW); Liang-Yen Wang, Hsinchu (TW); Chin Chin Cheng, Hsinchu (TW); Szu-Chi Liu, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 45 days.

(21) Appl. No.: 17/724,347

(22) Filed: Apr. 19, 2022

(65) Prior Publication Data

US 2022/0365724 A1 Nov. 17, 2022

Related U.S. Application Data

(60) Provisional application No. 63/186,854, filed on May 11, 2021.

(51) Int. Cl.
*G06F 3/06* (2006.01)
(52) U.S. Cl.
CPC .......... *G06F 3/0659* (2013.01); *G06F 3/0607* (2013.01); *G06F 3/0658* (2013.01); *G06F 3/0679* (2013.01)
(58) Field of Classification Search
CPC .... G06F 3/0659; G06F 3/0607; G06F 3/0658; G06F 3/0679; G06F 3/0604; G06F 11/07; G06F 3/06
See application file for complete search history.

(56) References Cited

U.S. PATENT DOCUMENTS

| | | | |
|---|---|---|---|
| 10,572,180 B1* | 2/2020 | Nemawarkar | G06F 3/0659 |
| 2014/0331001 A1 | 11/2014 | Liu | |
| 2015/0177988 A1* | 6/2015 | Rozental | G06F 3/0679 |
| | | | 711/103 |
| 2015/0178017 A1 | 6/2015 | Darrington et al. | |
| 2019/0303024 A1* | 10/2019 | Iwai | G06F 3/061 |
| 2022/0107758 A1* | 4/2022 | Benisty | G06F 3/0679 |

OTHER PUBLICATIONS

The International Search Report for counterpart PCT application PCT/CN2022/090241 issued by ISA/CN dated Aug. 1, 2022.

* cited by examiner

*Primary Examiner* — Khoa D Doan
(74) *Attorney, Agent, or Firm* — Tong J. Lee

(57) ABSTRACT

A host system initiates an abort of a command that has been placed into a submission queue (SQ) of the host system. The host system identifies at least one of a first outcome and a second outcome. When the first outcome indicates that the command is not completed and the second outcome indicates that the SQ entry has been fetched from the SQ, the host system sends an abort request to a storage device, and issues a cleanup request to direct the host controller to reclaim host hardware resources allocated to the command. The host system adds a completion queue (CQ) entry to a CQ and sets an overall command status (OCS) value of the CQ entry based on at least one of the first outcome and the second outcome.

18 Claims, 6 Drawing Sheets

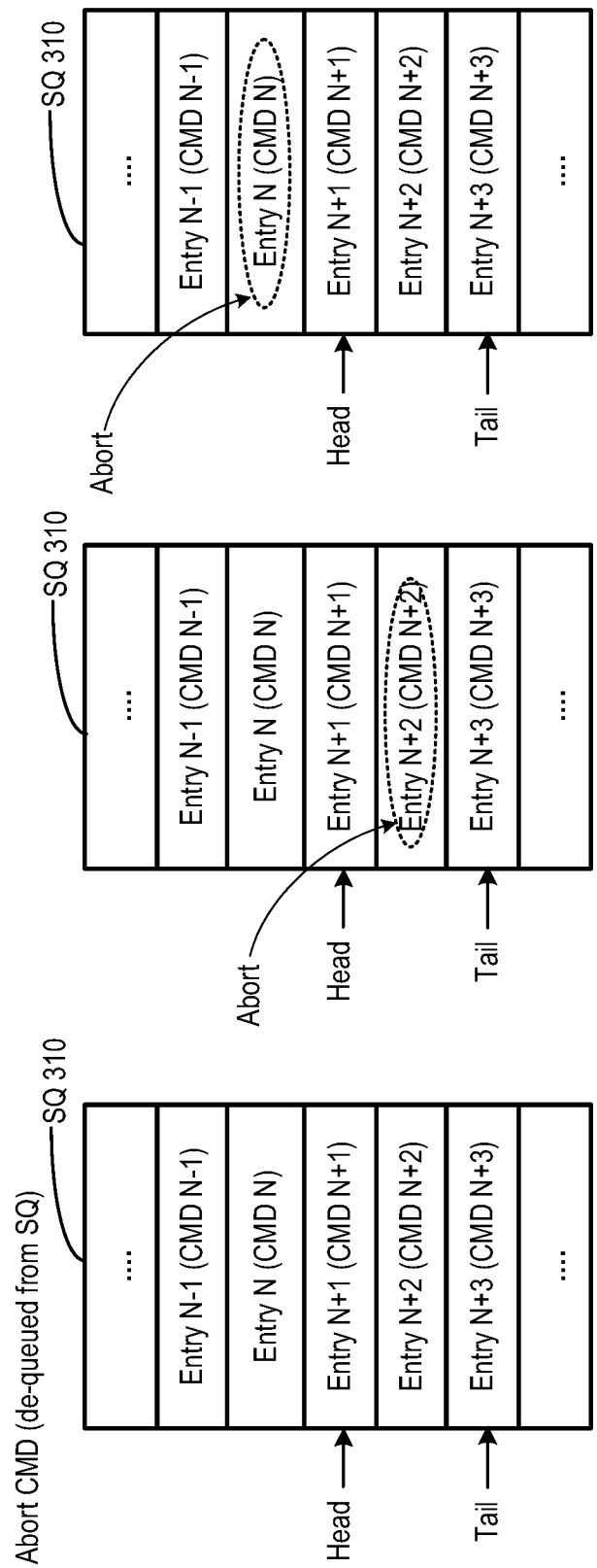

ABORT HANDLING BY HOST CONTROLLER FOR STORAGE DEVICE

CROSS-REFERENCE TO RELATED APPLICATIONS

This application claims the benefit of U.S. Provisional Application No. 63/186,854 filed on May 11, 2021, the entirety of which is incorporated by reference herein.

TECHNICAL FIELD

Embodiments of the invention relate to a storage device; more specifically, to the management of data transfer between a host and a storage device.

BACKGROUND

An electronic system typically includes a host coupled to a storage device. The host and the storage device are interconnected through an interface such as a Universal Flash Storage (UFS) interface, a Serial Advanced Technology Attachment (SATA) interface, a Small Computer Small Interface (SCSI), a Serial Attached SCSI (SAS), an embedded Multi-Media Card (eMMC) interface, etc.

The UFS interface is primarily for use in mobile systems between a host and a non-volatile memory (NVM) storage device. The host includes a host controller, which is responsible for managing data transfer between host software and a UFS storage device.

When an error condition occurs in the electronic system, host software may abort a data transfer command. For example, an error condition may be caused by a software crash, electrical or network problems, or other abnormalities during runtime. However, a race condition may arise between a) the host controller sending a command to be aborted to the storage device, and b) the storage device responding to the host software's query on whether the command has been received by the device. There is no certainty regarding whether or not the storage device has received the command to be aborted. This situation may occur when the host controller has fetched the command but is too busy to send it to the storage device. Without this certainty, the host software may repeatedly query the storage device to check whether the storage device has received the command. The repeated queries can result in an increase in latency and data transmissions between the host and the storage device. Thus, there is a need for improving the management of data transfers between a host and a storage device.

SUMMARY

In one embodiment, a method is performed by a host system coupled to a storage system. The method comprises: initiating an abort of a command that has been placed into a submission queue (SQ) of the host system, and identifying at least one of a first outcome and a second outcome. When the first outcome indicates that the command is not completed and the second outcome indicates that the SQ entry has been fetched from the SQ, the method further comprises: sending an abort request from the host system to the storage device, and issuing a cleanup request to direct a host controller to reclaim host hardware resources allocated to the command A completion queue (CQ) entry is added to a CQ and an overall command status (OCS) value of the CQ entry is set based on at least one of the first outcome and the second outcome.

In another embodiment, there is provided a host system coupled to a storage device. The host system includes a host controller, memory to store SQs and CQs, and one or more processors. The host system is operative to: initiate an abort of a command that has been placed into an SQ, and identify at least one of a first outcome and a second outcome. When the first outcome indicates that the command is not completed and the second outcome indicates that the SQ entry has been fetched from the SQ, the host system is further operative to send an abort request to the storage device, issue a cleanup request to direct the host controller to reclaim host hardware resources allocated to the command, and add a CQ entry to a CQ and set an OCS of the CQ entry based on at least one of the first outcome and the second outcome.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIGS. 3A, 3B, and 3C are diagrams illustrating a submission queue (SQ) in which a host driver places a command that is later to be aborted according to some embodiments.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide hardware support for a host system to reclaim hardware resources after a command abort. The host system includes a host driver and a host controller. Initially, the host driver issues a command to be executed by a storage system. The host driver places a command, in the form of a command descriptor, into a submission queue (SQ). The host controller fetches the command from the SQ and sends the command to the storage system. At some point during the host system operation, the host driver initiates an abort of the command Depending on the timing of the abort and the command fetch and execution, the control flow governing the host system operation leads to one of three scenarios. The control flow includes the host system making two determinations. The first determination is regarding whether the execution of the command is completed. The second determination is regarding whether the command to be aborted has been fetched from the SQ. In the following disclosure, the operations performed by the host system in each of the scenarios are described.

In one embodiment, the first scenario is command completion, the second scenario is command nullification, and the third scenario is command abort. In the first scenario, the storage device sends a command completion response to the host system. In the second scenario, the host controller has not fetched the command from the SQ, and, therefore, can skip fetching the command. In the third scenario, the command has been sent to the storage device and no response reporting command completion is received from the storage device. The system and method described herein ensure that the host controller cleans up (i.e., reclaims) the host hardware resources allocated to the command when the command is aborted.

In each of the three scenarios, the host controller adds a completion queue (CQ) entry to a CQ to indicate, in an overall command status (OCS) field of the CQ entry, command completion (first scenario), command nullification (second scenario), or command abort (third scenario).

Figure 1:
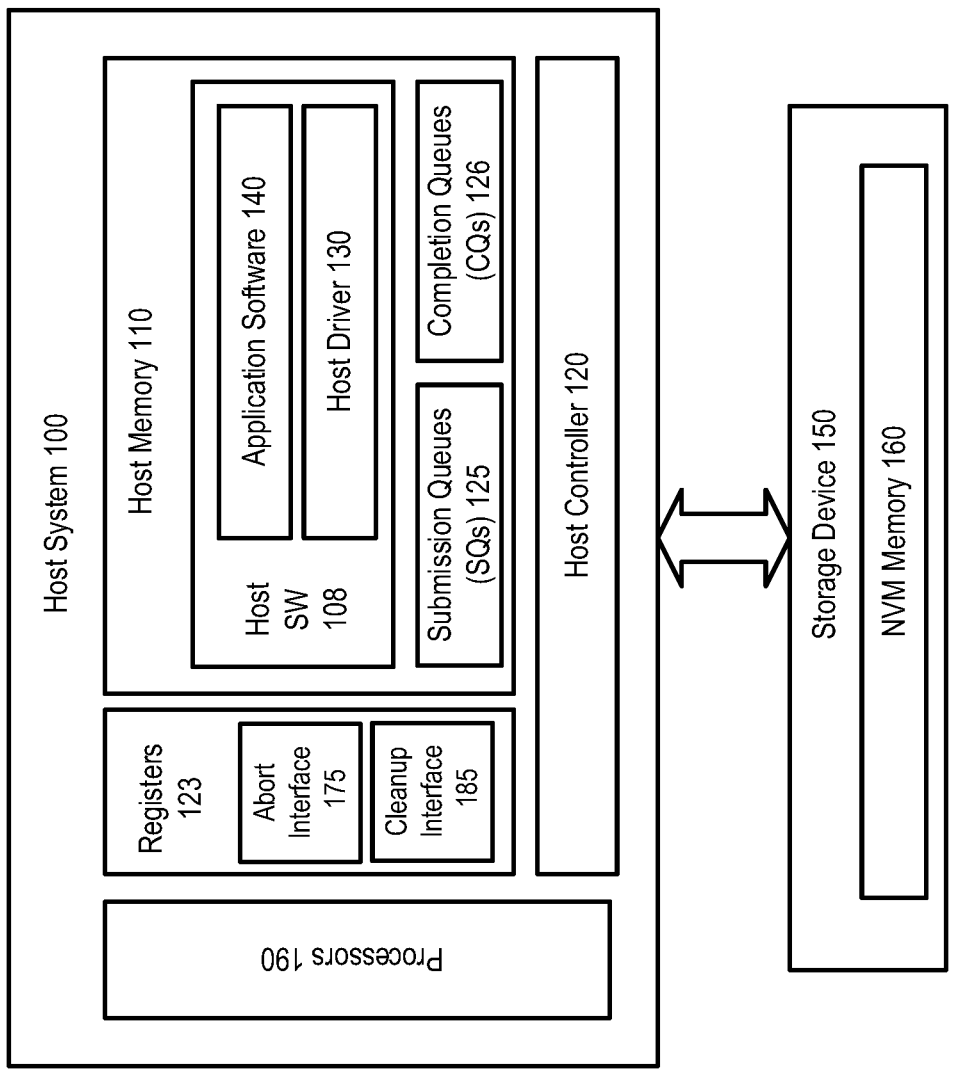
FIG. 1 is a block diagram illustrating a host system coupled to a storage system according to one embodiment.

FIG. 1 is a schematic diagram illustrating a host system 100 coupled to a storage device 150 (also referred to as a device) according to one embodiment. The host system 100 includes host software 108 such as a host driver 130 and application software 140. The host software 108 may be stored in host memory 110 of the host system 100. The host memory 110 may include memory devices such as dynamic random access memory (DRAM), static RAM (SRAM), and/or other volatile and non-volatile memory. The host system 100 also includes one or more processors 190 such as general-purpose processors (e.g., a central processing unit (CPU), a digital signal processor (DSP), a graphics processing unit (GPU), etc.) and/or special-purpose circuits to perform the operations of the host software 108. In one embodiment, the host system 100 may be a multi-core system.

The host system 100 also includes a host controller 120 to manage data transfer between the host system 100 and the storage device 150. The host controller 120 may be implemented by a combination of processing hardware and software programs. An example of NVM memory is flash memory. In one embodiment, the host system 100 may be integrated as a system-on-a-chip (SOC). It is understood the embodiment of FIG. 1 is simplified for illustration purposes. Additional hardware components may be included.

The storage device 150 includes storage units such as non-volatile memory (NVM) memory 160. In one embodiment, the storage device 150 is a UFS device. That is, the exchange of requests, data, and responses between the host controller 120 and the storage device 150 follows a standard such as the UFS standard. Although UFS is described in the disclosure, it should be understood that the method and system described herein can be applied to other storage system standards.

Referring to the host system 100 as "host" and the storage device 150 as "device," each UFS command includes three phases: a request phase (from host to device), a data in/out phase (from device to host, or from host to device), and a response phase (from device to host). In this disclosure, an example of the request phase is when the host fetches and sends a command to the device.

In one embodiment, the host system 100 manages multiple queues in the host memory 110. The multiple queues include a set of submission queues (SQs) 125 and a set of completion queues (CQs) 126. The host controller 120 and the host driver 130 may communicate via these queues and a set of registers 123. For each SQ 125, the host driver 130 is the producer and the host controller 120 is the consumer. The host driver 130 uses the SQs 125 to submit command descriptors to the host controller 120, indicating the commands to be processed by the storage device 150. It should be understood that, for ease of description, in this disclosure "submitting a command to an SQ" and "fetching a command from an SQ" are used interchangeably as "submitting a command descriptor to an SQ" and "fetching a command descriptor from the SQ," respectively. A command descriptor identifies a command and points to the instructions of the command stored in the host memory 110.

Each SQ 125 identifies the CQ 126 that will receive its command completion notification. For each CQ 126, the host controller 120 is the producer and the host driver 130 is the consumer. The host controller 120 uses the CQs 126 to indicate an overall command status (OCS) to the host driver 130. Each CQ entry identifies in which SQ the command originated, the unique identifier for that command, and an OCS field.

In one embodiment, both the SQs 125 and the CQs 126 are circular queues and are collectively referred to as multi-circular queues (MCQs). A circular queue uses a head pointer and a tail pointer to keep track of its current content. Queue entries are removed from the head of the queue for processing and new entries are added to the tail of the queue.

In one embodiment, the registers 123 include an abort interface 175 and a cleanup interface 185. In one embodiment, the abort interface 175 includes an SQ enable register and an SQ status register. The SQ enable register includes a 1-bit SQ enable indicator (SQx.Enable) for each SQ for the host driver 130 to indicate whether the SQ is enabled or disabled for fetching. The SQ status register includes a 1-bit SQ status indicator (SQx.Status) for each SQ for the host controller 120 to confirm that the corresponding SQ is running or stopped for fetching. The suffix 'x' in SQx represents the index for identifying an SQ. For each SQ, the host driver 130 can enable and disable the host controller's fetching operations by setting the 1-bit SQ enable indicator (SQx.Enable) in the SQ enable register. For each SQ, the host controller 120 can inform the host driver 130 of the SQ's status (e.g., stopped or running) by setting the 1-bit SQ status indicator (SQx.Status) in the SQ status register. In one embodiment, the cleanup interface 185 includes a register that has a tag field used by the host driver 130 to identify the command to be cleared, and a 1-bit indicator field used by the host driver 130 to trigger the command cleanup operation and also used by the host controller 120 to confirm the completion of the cleanup. For example, the host driver 130 may set the 1-bit indicator to 1 to trigger a command cleanup operation and the host controller 120 may reset the 1-bit indicator to 0 when the cleanup operation is finished. It is understood that in alternative embodiments the meaning of "setting" and "resetting" with respect to the binary values 1 and 0 may be reversed.

The host controller 120 sends the commands in the SQ to the storage device 150 in the order that they are placed into the SQ. After the storage device 150 executes a command, it notifies the host controller 120 of the completion. The host controller 120 posts the completion information in a CQ corresponding to the originating SQ to inform the host driver 130 of the completion of the requested data transfer.

Figure 2A:
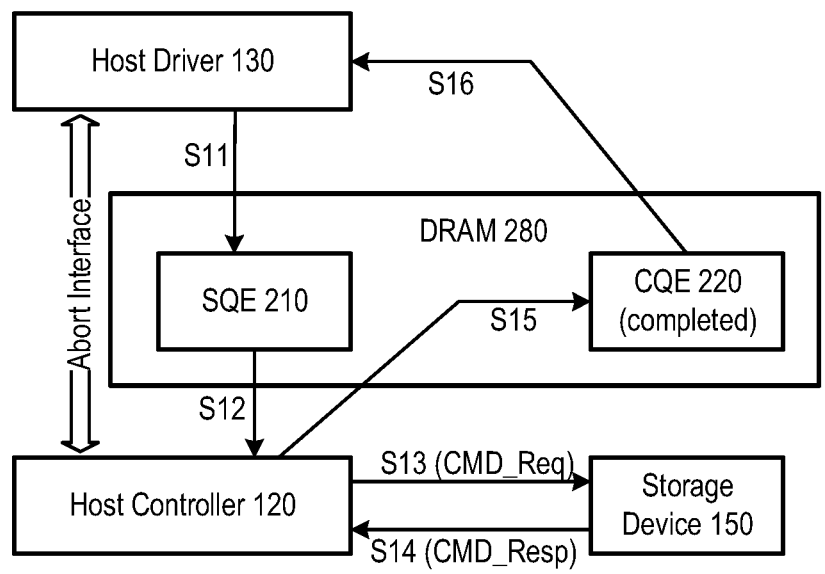
FIGS. 2A, 2B, and 2C are diagrams illustrating different scenarios in which a host driver issues an abort request according to some embodiments.

FIG. 2A is a diagram illustrating a first scenario in which the host driver 130 initiates an abort request according to one embodiment. The abort request is made to abort a command (e.g., CMD). In the first scenario, the abort request may be initiated after the storage device 150 has completed the CMD. Thus, before describing the first scenario, it is helpful to first describe the steps for command completion.

Initially, at step S11, the host driver 130 issues the CMD to the host controller 120 by writing a command in the form of a command descriptor to an SQ. The SQ and the corresponding CQ are both in the host memory; e.g., a DRAM 280. The CMD descriptor, which is shown as an SQ entry (i.e., SQE 210), includes a pointer that points to the corresponding command instructions stored in a memory (e.g., the DRAM 280). At step S12, the host controller 120 fetches SQE 210, and at step S13 sends a command request (i.e., CMD_Req) to the storage device 150 to request execution of the CMD. The storage device 150 executes the CMD and, at step S14 sends CMD_Resp to the host controller 120 to indicate completion of the CMD. Upon receiving CMD_Resp, the host controller 120 at step S15 posts a CQ entry (i.e., CQE 220) in the CQ, and sets the OCS field of CQE 220 to a value indicating "command completed." After the CMD is completed successfully, the host driver 130 is notified when CQE 220 is posted. The host driver 130 reports to the upper layer the data from the storage device 150, if any, and the command has finished.

When the host driver 130 initiates an abort request, it stops the host controller 120 from fetching SQ entries by communicating with the host controller 120 via the abort interface 175 as described previously in connection with FIG. 1. In all three scenarios described in this disclosure, SQ fetching is stopped (i.e., disabled) at the beginning of abort initiation, and SQ fetching is resumed when the abort is handled in one of the possible ways; e.g., command completion, command nullification, or command abort. For example, the host driver 130 may set SQx.Enable=0 to disable SQ fetching. When the host controller 120 detects SQx.Enable=0, it finishes fetching the current entry and stops further fetching from the SQ. The host controller 120 then sets SQx.Status=0 to confirm disabled fetching. It is understood that in alternative embodiments the meaning of the binary values 0 and 1 may be reversed.

Referring to FIG. 2A, in the first scenario, the host driver 130 initiates the abort request after the host controller 120 receives CMD_Resp from the storage device 150 at step S14. At this point, it is too late for the storage device 150 to abort the CMD. Thus, steps S15 and S16 are carried out as mentioned before, and the host driver 130 sets SQx.Enable=1 to enable SQ fetching and the host controller 120 sets SQx.Status=1 to confirm resumed SQ fetching.

Figure 2B:
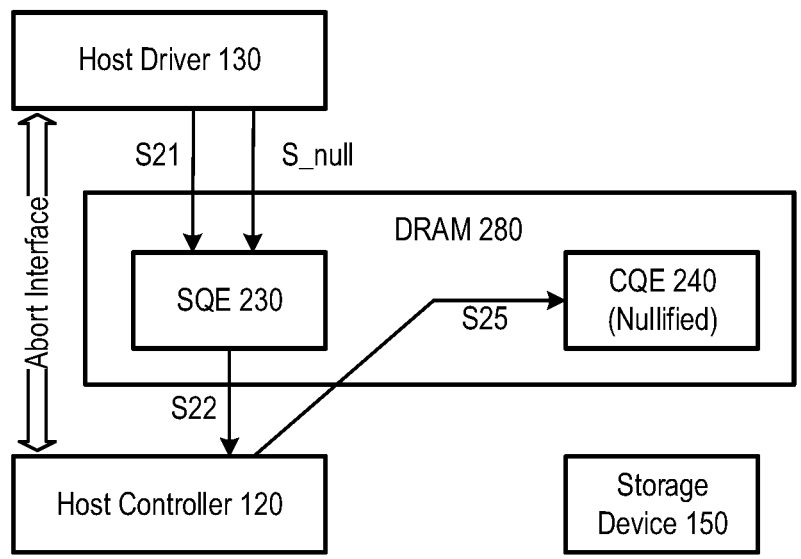

FIG. 2B is a diagram illustrating a second scenario in which the host driver 130 issues an abort request according to another embodiment. In the second scenario, the abort request occurs when the CMD descriptor is still enqueued in the SQ and has not been fetched. Initially, at step S21, the host driver 130 issues the CMD to the host controller 120 by placing a CMD descriptor (i.e., SQE 230) in the SQ. The host driver 130 issues an abort request to abort the CMD before SQE 230 is fetched by the host controller 120. Similar to the first scenario, the host driver 130 stops the host controller 120 from SQ fetching via the abort interface 175. Having detected that SQE 230 has not been fetched from the SQ by the host controller 120, the host driver 130 at step S_null changes the command type of the CMD to a value indicating "nullified." The nullified command type indicates to the host controller 120 that SQE 230 is to be skipped. Thus, the host controller 120 does not fetch SQE 230 nor does it sends SQE 230 to the storage device 150. When SQ fetching is resumed, the host controller 120 skips SQE 230. At step S25 the host controller 120 posts a CQ entry (i.e., CQE 240) in the CQ and sets the OCS field of CQE 240 to a value indicating "command nullified." There are no cleanup operations in the second scenario as host hardware resources have not been allocated to the CMD.

Figure 2C:
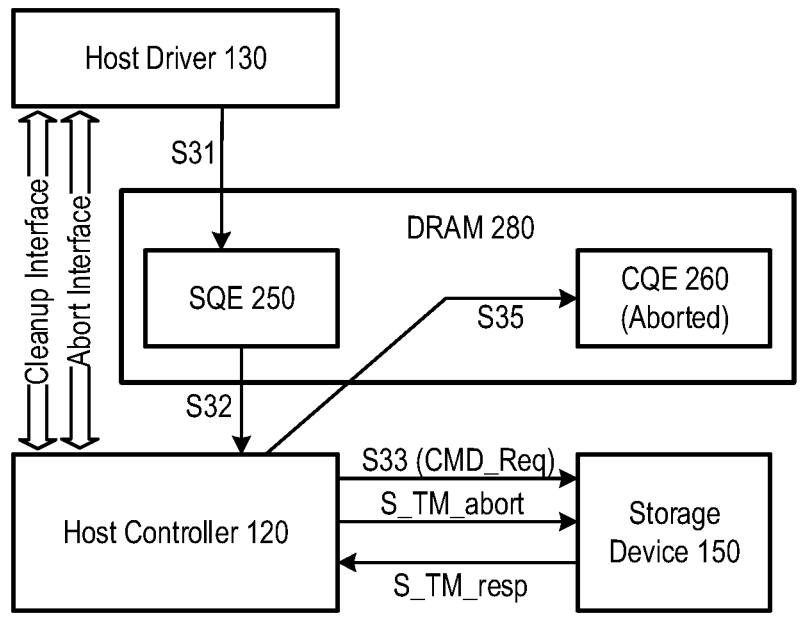

FIG. 2C is a diagram illustrating a third scenario in which the host driver 130 issues an abort request according to yet another embodiment. In the third scenario, the abort request occurs after the CMD is sent to the storage device 150. Initially, at step S31, the host driver 130 issues the CMD to the host controller 120 by placing a CMD descriptor (i.e., SQE 250) in the SQ. At step S32, the host controller 120 fetches SQE 250, and at step S33 sends a command request (i.e., CMD_Req) to the storage device 150 to request execution of the CMD. At this point, the host driver 130 initiates an abort request to abort the CMD. Similar to the first and the second scenarios, the host driver 130 stops the host controller 120 from SQ fetching via the abort interface 175.

When the host controller 120 receives the abort request, it proceeds to step S_TM_abort to send a task management (TM) command requesting a CMD abort. The storage device 150 may or may not have completed the CMD at this point. However, once the storage device 150 receives the CMD abort request, it cleans up the device-side resources used by the CMD, and at step S_TM_resp sends an abort response. Upon receiving the abort response, the host driver 130 requests the host controller 120 to clean up the hardware resources (e.g., internal buffers) used by the CMD. In one embodiment, the host driver 130 may use the cleanup interface 185 (FIG. 1) to communicate with the host controller 120 regarding which command to clean up, and the host controller 120 can use the cleanup interface 185 to confirm the completion of the cleanup. After the host driver 130 sends the cleanup request to the host controller 120, the host controller 120 at step S35 posts a CQ entry (i.e., CQE 260) in the CQ, and sets the OCS field of CQE 260 to a value indicating "command aborted."

FIGS. 3A, 3B, and 3C are diagrams illustrating an SQ 310 in the first scenario, the second scenario, and the third scenario, respectively, according to some embodiments. Referring also to FIG. 1, SQ 310 may be any of SQs 125. A head pointer of SQ 310 points to the last entry that the host controller 120 has fetched from SQ 310, and a tail pointer of SQ 310 points to the last entry that the host driver 130 has added to SQ 310. Referring to FIG. 3A, the host driver 130 may add an entry (e.g., Entry N+3) to SQ 310 and update the tail pointer to point to the added entry. The host controller 120 may fetch an entry (e.g., Entry N+1) from SQ 310 and update the head pointer to point to the entry (e.g., Entry N+1).

For simplicity of description, SQ entries and the commands in the SQ entries use the same numerical indices; e.g., entry N contains command N. It should be understood that the indices are used to indicate the placement order in the queue. Thus, command N can be any data transfer command or request in compliance with a predetermined protocol.

Referring also to FIG. 1, in the first scenario (FIG. 3A), the request to abort a command CMD arrives after the corresponding SQ entry is de-queued from SQ 310. That is, the CMD has already been sent from SQ 310 to the storage device 150. Furthermore, the storage device 150 has already sent out CMD_Resp to indicate command completion. Thus, the abort does not take place. In the second scenario (FIG. 3B), the request to abort a command CMD N+2 arrives when the corresponding SQ entry has not been fetched from the SQ 310; e.g., that is, entry N+2 is between the SQ's head pointer (exclusive) and tail pointer (inclusive). Marking entry N+2 as nullified causes the host controller 120 to skip over entry N+2 in SQ fetching. In the third scenario (FIG. 3C), the request to abort a command CMD N arrives when CMD N is in execution and before the host controller 120 receives CMD_Resp from the storage device 150. That is, SQ entry N corresponding to CMD N is before and including the entry pointed to by the head pointer. According to one embodiment, all entries of SQ 310 before and including the entry pointed to by the head pointer have been fetched, and the entries between the SQ's head pointer (exclusive) and tail pointer (inclusive) have not been fetched.

Figure 4:
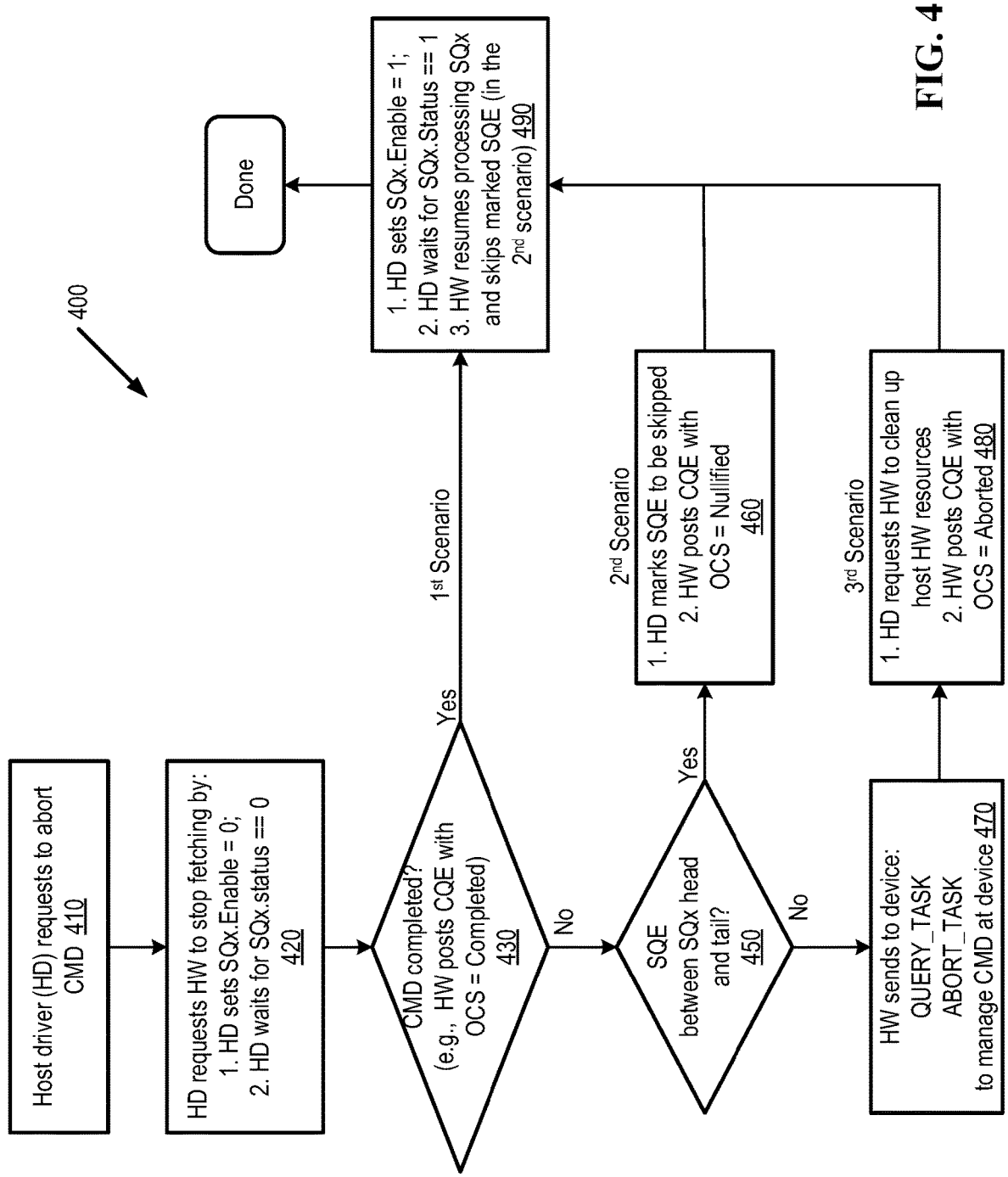
FIG. 4 is a flow diagram illustrating an abort process according to one embodiment.

FIG. 4 is a flow diagram illustrating an abort process 400 according to one embodiment. Referring also to FIG. 1, the host driver (HD) indicated in FIG. 4 may be the host driver 130, and the hardware (HW) may be the host controller 120. The host driver has placed a descriptor of a command (e.g., CMD) in an SQ (which is shown as SQx) for the hardware to send to the storage device for execution. For ease of description, the SQx entry corresponding to the CMD is referred to as an SQE and the CQx entry corresponding to the CMD is referred to as a CQE.

Process 400 starts at step 410 when the host driver initiates an abort request to abort the CMD. To prevent unwanted race conditions, the host driver at step 420 also requests the hardware to stop fetching from the SQx. In one embodiment, the host driver sets SQx.Enable to 0, and waits for SQx.Status to become 0. The hardware sets SQx.Status to 0 when it has stopped fetching from the SQx. At step 430, the host driver determines whether the storage device has sent a CMD completion response. The CMD completion response indicates that CMD execution is completed (i.e., the first scenario). In one embodiment, the determination at step 430 is "yes" after the hardware posts to the CQx a new CQx entry (i.e., CQE) identifying the CMD with OCS set to a value indicating command completed. At step 490, the host driver sets SQx.Enable to 1, and waits for SQx.Status to become 1. The hardware sets SQx.Status to 1 in response to the host driver setting SQx.Enable to 1 and resumes fetching from SQx.

If at step 430, it is determined that the storage device has not sent a CMD completion response, the host driver at step 450 further determines whether the SQE is deeply enqueued in the SQx, where "deeply enqueued" means that the SQE has not been fetched from the SQx. If the SQE is deeply enqueued; e.g., between the head pointer (exclusive) and the tail pointer (inclusive) of the SQx, process 400 proceeds to step 460 in which the host driver marks the SQE to be skipped; i.e., nullified (the second scenario). The hardware posts a CQE to the CQx where the CQE identifies the CMD with OCS set to a value indicating command nullified. Process 400 then proceeds to step 490 in which the host driver 130 and the host controller 120 communicate over the abort interface 175 (FIG. 1) to resume SQx fetching. The hardware skips the marked SQE when it resumes processing the SQx.

If at step 450, it is determined that the SQE is not between the head pointer (exclusive) and the tail pointer (inclusive) of the SQx (the third scenario), the hardware at step 470 sends a query task task management (TM) command to the storage device to query about the CMD. If the storage device acknowledges that it has received the CMD, the hardware then sends an abort task TM command to the storage device to request the CMD be aborted. After the storage device aborts the CMD, it sends an abort response to the host system. At step 480, the host driver requests the hardware to clean up host hardware resources allocated to the CMD. The cleanup request may be communicated via the cleanup interface 185 (FIG. 1). After receiving the cleanup request, the hardware at step 480 posts a CQE to the CQx where the CQE identifies the CMD with OCS set to a value indicating command aborted. Process 400 then proceeds to step 490 to resume SQx fetching.

Figure 5:
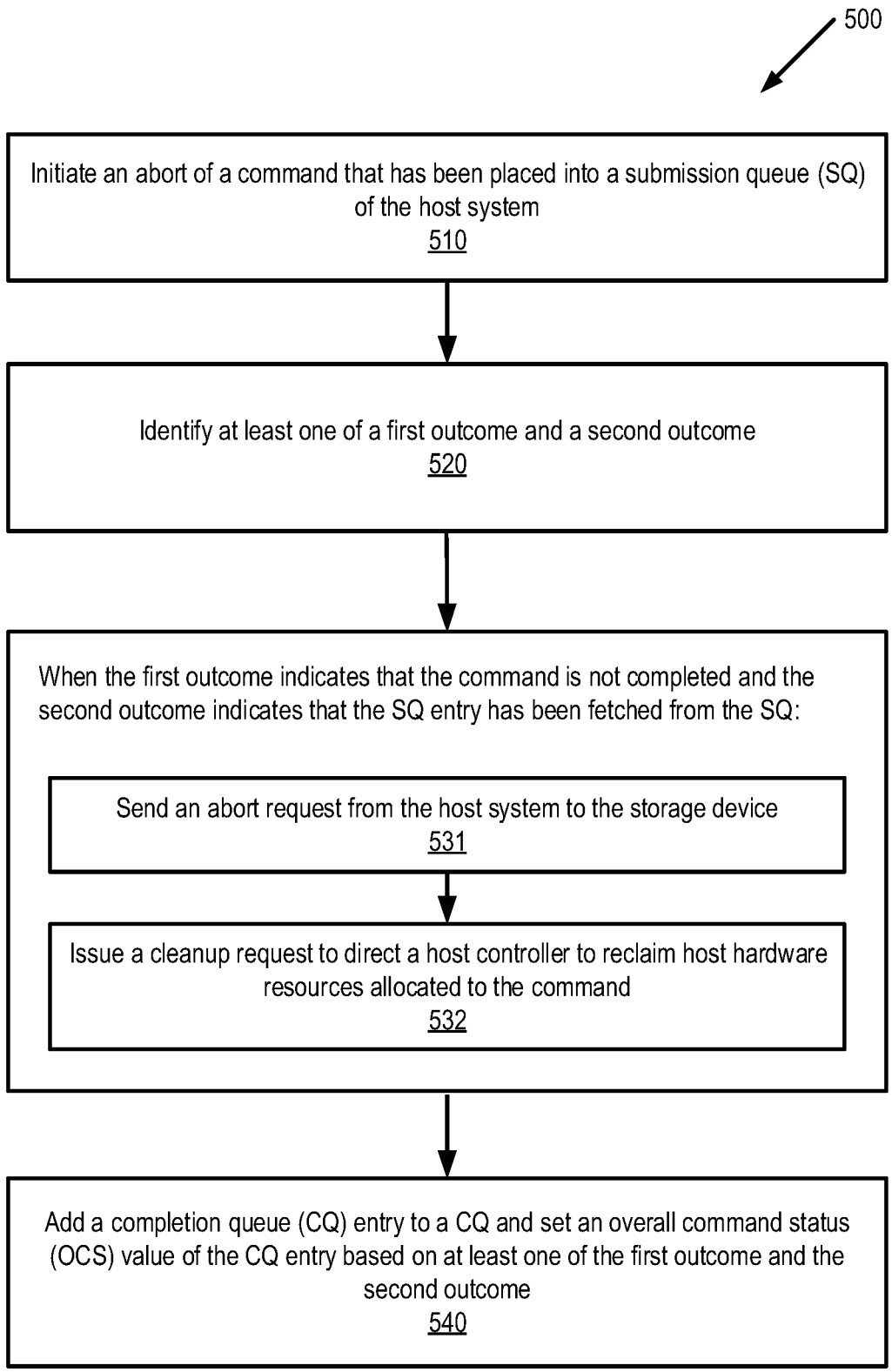
FIG. 5 is a flow diagram illustrating a method of a host system coupled to a storage device according to one embodiment.

FIG. 5 is a flow diagram illustrating a method 500 of a host system coupled to a storage device according to one embodiment. More specifically, method 500 may be performed by a host system that includes a host controller and a host driver, such as the host system 100 in FIG. 1. In one embodiment, the host system communicates with the storage device according to a Universal Flash Storage (UFS) standard.

Method 500 begins at step 510 when a host driver initiates an abort of a command that has been placed into an SQ of the host system. The host system at step 520 identifies at least one of a first outcome and a second outcome. In one embodiment, the host system makes a first determination and, depending on the first outcome of the first determination, may proceed to make a second determination to obtain a second outcome. The first outcome indicates whether the execution of the command is completed. The second outcome indicates whether an SQ entry describing the command has been fetched from the SQ. In one embodiment, an SQ entry has been fetched from the SQ when the SQ entry is before and including an entry pointed to by the head pointer of the SQ. An SQ entry has not been fetched from the SQ when the SQ entry is between the head pointer (exclusive) and the tail pointer (inclusive) of the SQ. When the first outcome indicates that the command is not completed and the second outcome indicates that the SQ entry has been fetched from the SQ, the host system at step 531 sends an abort request to the storage device, and at step 532 issues a cleanup request to direct the host controller to reclaim host hardware resources allocated to the command. At step 540, the host system adds a CQ entry to a CQ and sets an OCS value of the CQ entry based on at least one of the first outcome and the second outcome.

In one embodiment, the OCS value is set to indicate command abort under a scenario in which the first outcome indicates that the execution of the command is not completed and the second outcome indicates that the SQ entry has been fetched from the SQ. The OCS value is set to indicate command nullification under a scenario in which the first outcome indicates that the execution of the command is not completed and the second outcome indicates that the SQ entry has not been fetched from the SQ. The OCS value is set to indicate command completion under a scenario in which the first outcome indicates that the execution of the command is completed.

In one embodiment, the first outcome is determined based on whether the host system receives the command completion response from the storage device. In one embodiment, the host system sets the OCS value to indicate command abort after the host controller receives the cleanup request from the host driver. In one embodiment, the host system sets the OCS value to indicate command nullification after the host controller detects that the SQ entry for the command has been marked by the host driver as nullified.

In one embodiment, the host driver resets a 1-bit value in an abort interface between the host driver and the host controller to stop the host controller from further fetching entries from the SQ, and sets the 1-bit value in the abort interface to direct the host controller to resume fetching from the SQ.

In one embodiment, the host driver sets a 1-bit value in a cleanup interface between the host driver and the host controller to direct the host controller to clean up the host hardware resources allocated to the command After cleaning up the host hardware resources, the host controller resets the 1-bit value in the cleanup interface.

In the preceding description, the host driver is described as part of the host software. However, it should be understood that some operations of the host driver described herein can be performed by host hardware.

The operations of the flow diagrams of FIGS. 4 and 5 have been described with reference to the exemplary embodiment of FIG. 1. However, it should be understood that the operations of the flow diagrams of FIGS. 4 and 5 can be performed by embodiments of the invention other than the embodiment of FIG. 1, and the embodiment of FIG. 1 can perform operations different than those discussed with reference to the flow diagrams. While the flow diagrams of FIGS. 4 and 5 show a particular order of operations performed by certain embodiments of the invention, it should be understood that such order is exemplary (e.g., alternative embodiments may perform the operations in a different order, combine certain operations, overlap certain operations, etc.).

Various functional components, blocks, or modules have been described herein. As will be appreciated by persons skilled in the art, the functional blocks or modules may be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method performed by a host system coupled to a storage device, comprising:
   initiating an abort of a command, wherein the command has been placed into a submission queue (SQ) of the host system as an SQ entry; and
   identifying at least one of a first outcome and a second outcome,
   wherein, when the first outcome indicates that the host system has not received a command completion response from the storage device and the second outcome indicates that the SQ entry has been fetched from the SQ, the method further comprises:
   sending an abort request from the host system to the storage device;
   issuing a cleanup request to direct a host controller to reclaim host hardware resources allocated to the command; and
   adding a completion queue (CQ) entry to a CQ and setting an overall command status (OCS) value of the CQ entry to indicate command abort regardless of status of the command in the storage device.

2. The method of claim 1, wherein the second outcome is identified based on a position of an entry pointed to by a head pointer of the SQ.

3. The method of claim 1, further comprising:
   setting the OCS value to indicate command abort after the host controller receives the cleanup request.

4. The method of claim 1, wherein the OCS value is set to indicate command nullification under a scenario in which the first outcome indicates that the execution of the command is not completed and the second outcome indicates that the SQ entry for the command has not been fetched from the SQ.

5. The method of claim 1, further comprising:
   setting the OCS value to indicate command nullification after the host controller detects that the SQ entry for the command has been marked by a host driver as nullified.

6. The method of claim 1, wherein the OCS value is set to indicate command completion after the host system receives the command completion response from the storage device.

7. The method of claim 1, further comprising:
   resetting, by a host driver, a 1-bit value in an abort interface between the host driver and the host controller to stop the host controller from further fetching entries from the SQ; and
   setting the 1-bit value in the abort interface to direct the host controller to resume fetching from the SQ.

8. The method of claim 1, wherein issuing the cleanup request further comprises:
   setting, by a host driver, a 1-bit value in a cleanup interface between the host driver and the host controller to direct the host controller to clean up the host hardware resources allocated to the command; and
   after cleaning up the host hardware resources, the host controller resetting the 1-bit value in the cleanup interface.

9. The method of claim 1, wherein the host system communicates with the storage device according to a Universal Flash Storage (UFS) standard.

10. A host system that is coupled to a storage device, comprising:
    a host controller;
    memory to store a plurality of submission queues (SQs) and a plurality of completion queues (CQs); and
    one or more processors,
    wherein the host system is operative to:
    initiate an abort of a command, wherein the command has been placed into an SQ as an SQ entry; and
    identify at least one of a first outcome and a second outcome, wherein, when the first outcome indicates that the host system has not received a command completion response from the storage device and the second outcome indicates that the SQ entry has been fetched from the SQ, the host system is further operative to:
    send an abort request to the storage device; and
    issue a cleanup request to direct the host controller to reclaim host hardware resources allocated to the command; and add a CQ entry to a CQ and set an overall command status (OCS) of the CQ entry to indicate command abort regardless of status of the command in the storage device.

11. The host system of claim 10, wherein the second outcome is identified based on a position of an entry pointed to by a head pointer of the SQ.

12. The host system of claim 10, wherein the OCS value is set to indicate command abort after the host controller receives the cleanup request.

13. The host system of claim 10, wherein the OCS value is set to indicate command nullification under a scenario in which the first outcome indicates that the execution of the command is not completed and the second outcome indicates that the SQ entry for the command has not been fetched from the SQ.

14. The host system of claim 10, wherein the OCS value is set to indicate command nullification after the host controller detects that the SQ entry for the command has been marked by a host driver as nullified.

15. The host system of claim 10, wherein the OCS value is set to indicate command completion after the host system receives the command completion response from the storage device.

16. The host system of claim 10, further comprises an abort interface between a host driver and the host controller, wherein the host driver operative to reset a 1-bit value in the abort interface to stop the host controller from further fetching entries from the SQ, and to set the 1-bit value in the abort interface to direct the host controller to resume fetching from the SQ.

17. The host system of claim 10, further comprises an abort interface between a host driver and the host controller, wherein the host driver operative to set a 1-bit value in the cleanup interface to direct the host controller to clean up the host hardware resources allocated to the command, and the host controller operative to reset the 1-bit value in the cleanup interface after cleaning up the host hardware resources.

18. The host system of claim 10, wherein the host system communicates with the storage device according to a Universal Flash Storage (UFS) standard.

* * * * *